United States Patent
Takamori et al.

(10) Patent No.: US 9,465,159 B2
(45) Date of Patent: Oct. 11, 2016

(54) LIGHT SOURCE UNIT

(71) Applicant: PFU LIMITED, Ishikawa (JP)

(72) Inventors: Masaya Takamori, Ishikawa (JP); Haruka Fukushima, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/731,256

(22) Filed: Jun. 4, 2015

(65) Prior Publication Data
US 2016/0238780 A1     Aug. 18, 2016

(30) Foreign Application Priority Data
Feb. 18, 2015   (JP) ................................ 2015-030014

(51) Int. Cl.
| | |
|---|---|
| *F21V 8/00* | (2006.01) |
| *F21V 17/12* | (2006.01) |
| *F21K 99/00* | (2016.01) |
| *F21V 11/16* | (2006.01) |
| *F21Y 101/02* | (2006.01) |

(52) U.S. Cl.
CPC ............. *G02B 6/0088* (2013.01); *F21K 9/175* (2013.01); *F21V 11/16* (2013.01); *F21V 17/12* (2013.01); *G02B 6/0076* (2013.01); *G02B 6/0095* (2013.01); *F21Y 2101/02* (2013.01)

(58) Field of Classification Search
CPC  G02B 6/0076; G02B 6/0085; G02B 6/0088; G02B 6/0096; F21V 17/12; F21V 11/16; F21K 9/175
See application file for complete search history.

(56) References Cited

U.S. PATENT DOCUMENTS

| | | | |
|---|---|---|---|
| 2014/0332667 A1 | 11/2014 | Aramaki et al. | |
| 2015/0015924 A1* | 1/2015 | Fujiuchi | H04N 1/02835 358/474 |
| 2015/0156372 A1 | 6/2015 | Aramaki | |

FOREIGN PATENT DOCUMENTS

| | | |
|---|---|---|
| JP | 2007-265837 A | 10/2007 |
| JP | 2008-147847 A | 6/2008 |
| JP | 2009-065244 A | 3/2009 |
| JP | 2009-181814 A | 8/2009 |
| JP | 2009-181916 A | 8/2009 |

(Continued)

OTHER PUBLICATIONS

Office Action Japanese Patent Application No. 2015-030014 dated Jan. 26, 2016 with English translation.

*Primary Examiner* — Thomas M Sember
(74) *Attorney, Agent, or Firm* — McDermott Will & Emery LLP

(57) ABSTRACT

A light source unit includes light source substrates to emit light, a pair of first members arranged separately from each other, each provided with one light source substrates, a pair of light guide members having an outer circumferential surfaces where the light introduced therein is emitted therethrough, and a pair of second members to hold the pair of respective light guide members.

Each of the pair of second members is made of a metal material and includes two projecting portions and an opening formed between the projecting portions where the light emitted from the light guide member passes, and end portions attached to the pair of first members respectively, to receive heat generated from the light source substrate through the first members.

The pair of second members are arranged separately from each other forming a void portion therebetween to pass an optical axis of an image capturing device therethrough.

7 Claims, 11 Drawing Sheets

(56) References Cited

FOREIGN PATENT DOCUMENTS

| JP | 2012-038470 A | 2/2012 |
| JP | 2014-036405 A | 2/2014 |
| WO | 2013/099836 A1 | 5/2015 |

* cited by examiner

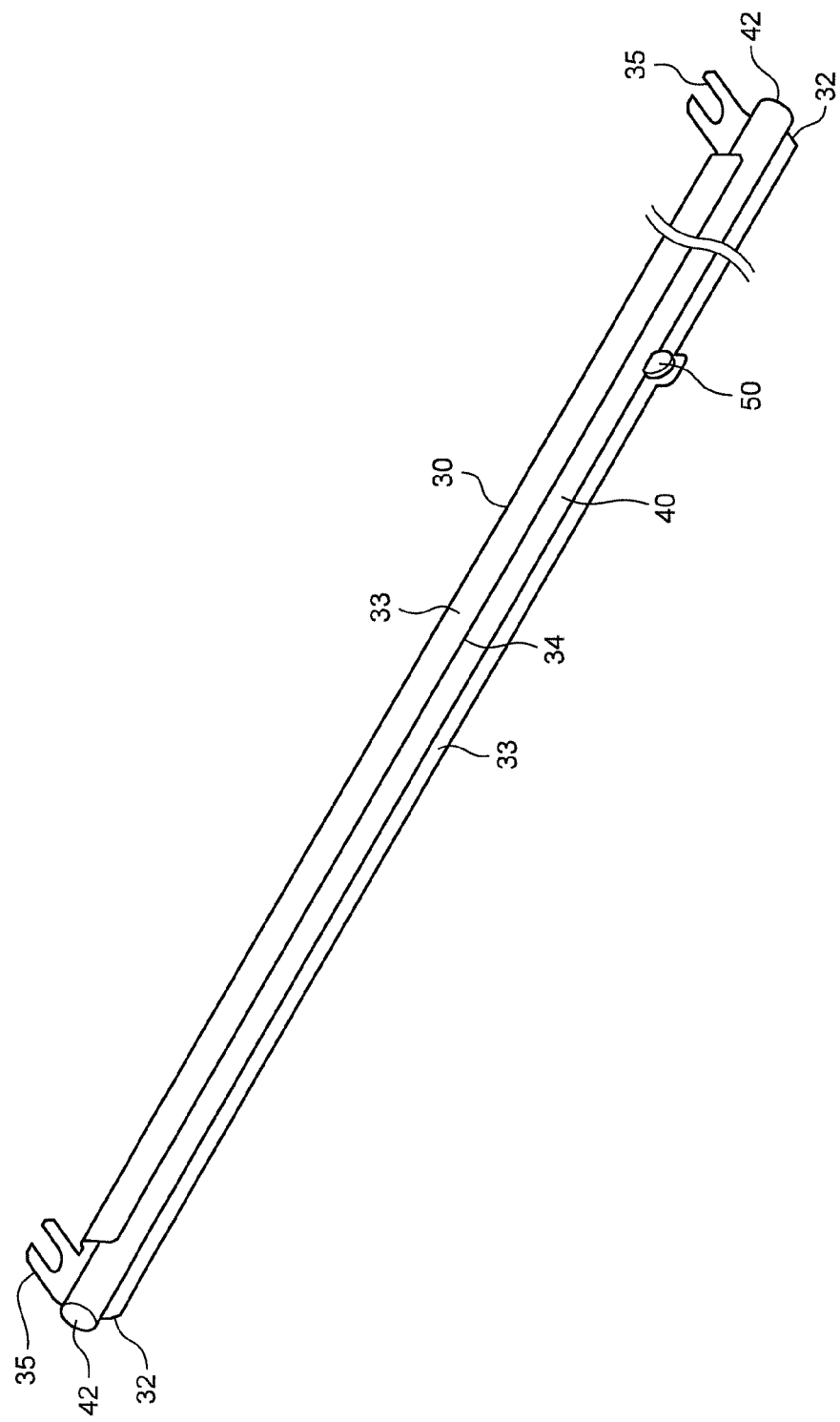

LIGHT SOURCE UNIT

CROSS-REFERENCE TO RELATED APPLICATION(S)

The present application claims priority to and incorporates by reference the entire contents of Japanese Patent Application No. 2015-030014 filed in Japan on Feb. 18, 2015.

BACKGROUND OF THE INVENTION

1. Field of the Invention

The present invention relates to a light source unit.

2. Description of the Related Art

Among types of light source units to emit light, some light source units emit light in a specialized manner in use of the light source units. Specifically, in conventional light source units, some light source units emit linear light. For example, a light source unit includes a columnar light guide member and a light emitting diode (LED) arranged on one end of the columnar light guide member, to emit linear light such that the light emitted from the LED is guided in the lengthwise direction of the light guide member so as to cause the light to be output through the outer circumferential surface of the light guide member (for example, see Japanese Patent Application Laid-open No. 2012-38470). In this case, the LED generates heat at the time of lighting. To cope with the heat, a heat dissipation member is provided along the light guide member extending in one direction and the heat dissipation member holds the light guide member. With this constitution, the heat generated at the time of lighting of the LED can be dissipated while holding the LED with predetermined strength ensured.

When a plurality of LEDs and light guide members are provided and linear light is emitted from the respective light guide members, the LEDs need to be arranged on end portions of the respective light guide members. When the LEDs are arranged on the end portions of the respective light guide members, assembly of the light source unit and an exchange operation of the LEDs tend to be troublesome. Moreover, the arrangement of the LEDs on the respective light guide members requires provision of the heat dissipation members for the respective light guide members, which can also result in a difficult and complicated assembly operation of the light source unit.

In contrast, when one heat dissipation member is provided for a plurality of light guide members and the one heat dissipation member holds the light guide members, regions of the respective light guide members that are covered by the heat dissipation member are small. In this case, heat dissipation performance by the heat dissipation member can be lowered in comparison with the case where the heat dissipation members are individually provided for the respective light guide members and strength when the heat dissipation member holds the light guide members can be lowered. Thus, when the light guide members are provided in plurality as described above, it is extremely difficult to ensure assembly performance and heat dissipation performance while ensuring strength when the light guide members are held.

SUMMARY OF THE INVENTION

It is an object of the present invention to at least partially solve the problems in the conventional technology.

According to an aspect of the invention, a light source unit comprises one or two light source substrates, each including light emitting elements mounted thereon; a pair of first members that are arranged separately from each other, at least one of the pair of first members is provided with one of the one or two light source substrates attached thereto; a pair of light guide members, each of which having end portions at respective both ends in an axial direction thereof, in each of which light from the light emitting elements is introduced therein from at least one of the end portions, and the pair of light guide members emitting the light introduced inside thereof through outer circumferential surfaces thereof; and a pair of second members between which the pair of respective light guide members are inserted, the pair of second members shielding a part of the light emitted through the outer circumferential surfaces of the pair of light guide members.

Each of the pair of second members is made of a metal material and includes at least a main body portion, two projecting portions extending from both end portions of the main body portion when viewed in an axial direction in directions different from an extending direction of the main body portion, and an opening formed between the projecting portions through which the light emitted from the light guide member passes, and each of the pair of second members includes end portions at both ends thereof in the axial direction, and the end portions are attached to the pair of first members respectively, in a state in which the pair of second members are arranged between the pair of first members, so that the pair of second members receive heat generated from the light source substrate through at least one of the first members.

The pair of second members are arranged separately from each other in a direction orthogonal to the axial direction, forming a void portion therebetween when viewed in the axial direction, so that an optical axis of an image capturing device passes through the void portion, and the pair of light guide members are held at least by the pair of respective second members.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7D is an explanatory view for explaining a state in which assembly of the light guide member into the frame is completed;

DETAILED DESCRIPTION OF THE PREFERRED EMBODIMENT

Hereinafter, an embodiment of a light source unit according to the present invention will be described in detail with reference to the drawings. The embodiment does not limit the invention. Constituent components in the following embodiment encompass constituent components that those skilled in the art can replace easily or that are substantially the same.

Embodiment

Figure 1:
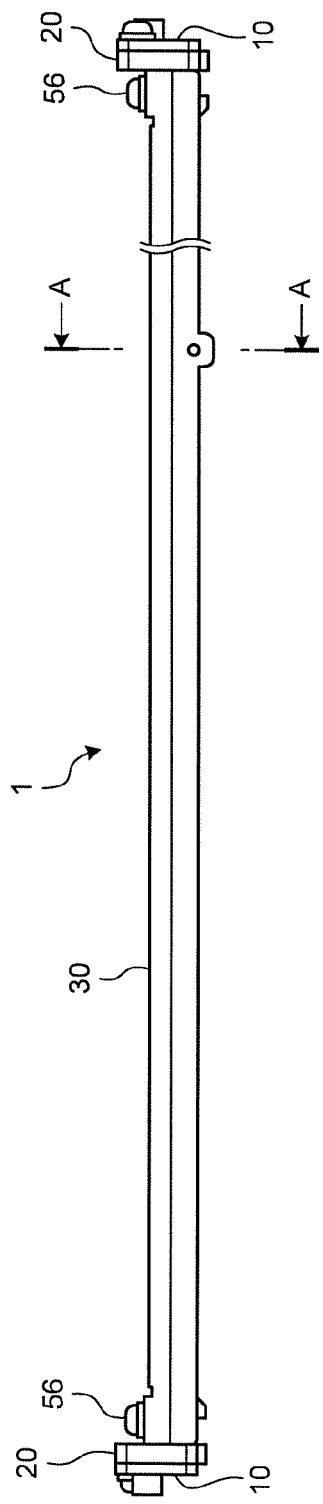
FIG. 1 is a side view of a light source unit according to an embodiment.
Figure 2:
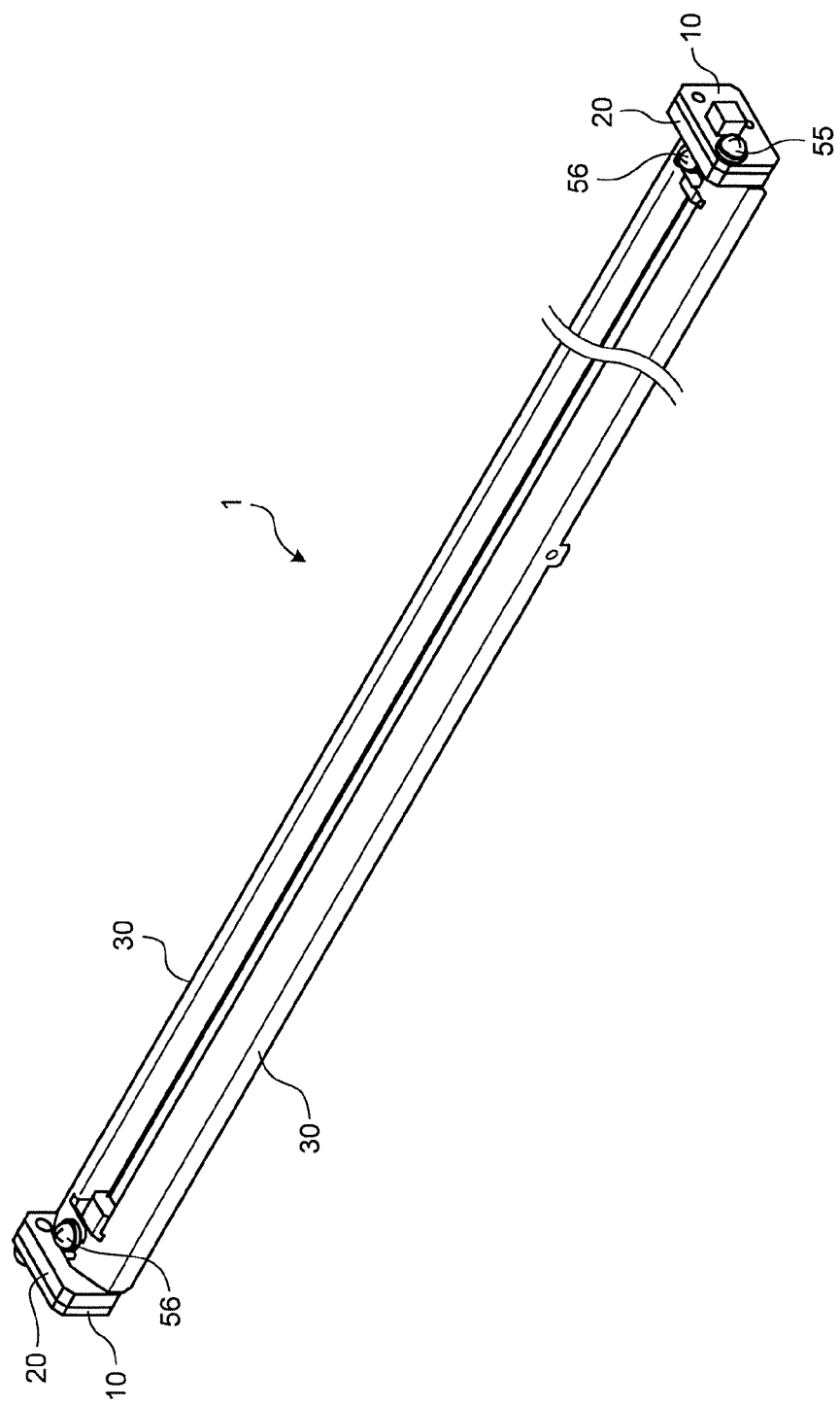
FIG. 2 is a perspective view of the light source unit as illustrated in FIG. 1.

FIG. 1 is a side view of a light source unit according to the embodiment. FIG. 2 is a perspective view of the light source unit as illustrated in FIG. 1. In a light source unit 1 in the present embodiment, light source substrates 10, on each of which light emitting diodes (LEDs) 11 (see FIG. 6) as light emitting elements are mounted, are attached to respective supporting members 20 which function as first members. The LEDs 11 that are mounted on the light source substrates 10 are provided as light sources in the light source unit 1 and the light source substrates 10 are attached to a pair of respective supporting members 20 which are arranged separately from each other. The supporting members 20 form a pair of supporting members 20 which are separated from each other. Frames 30 as second members extending between the pair of supporting members 20 are arranged between the supporting members 20. In other words, the pair of supporting members 20 are arranged at positions corresponding to both ends of the frames 30. The respective supporting members 20 are arranged in such a direction that the surfaces thereof to which the light source substrates 10 are attached are located at the sides opposite to the sides at which the frames 30 are located. All of the supporting members 20 and the frames 30 are made of a metal material.

Figure 3:
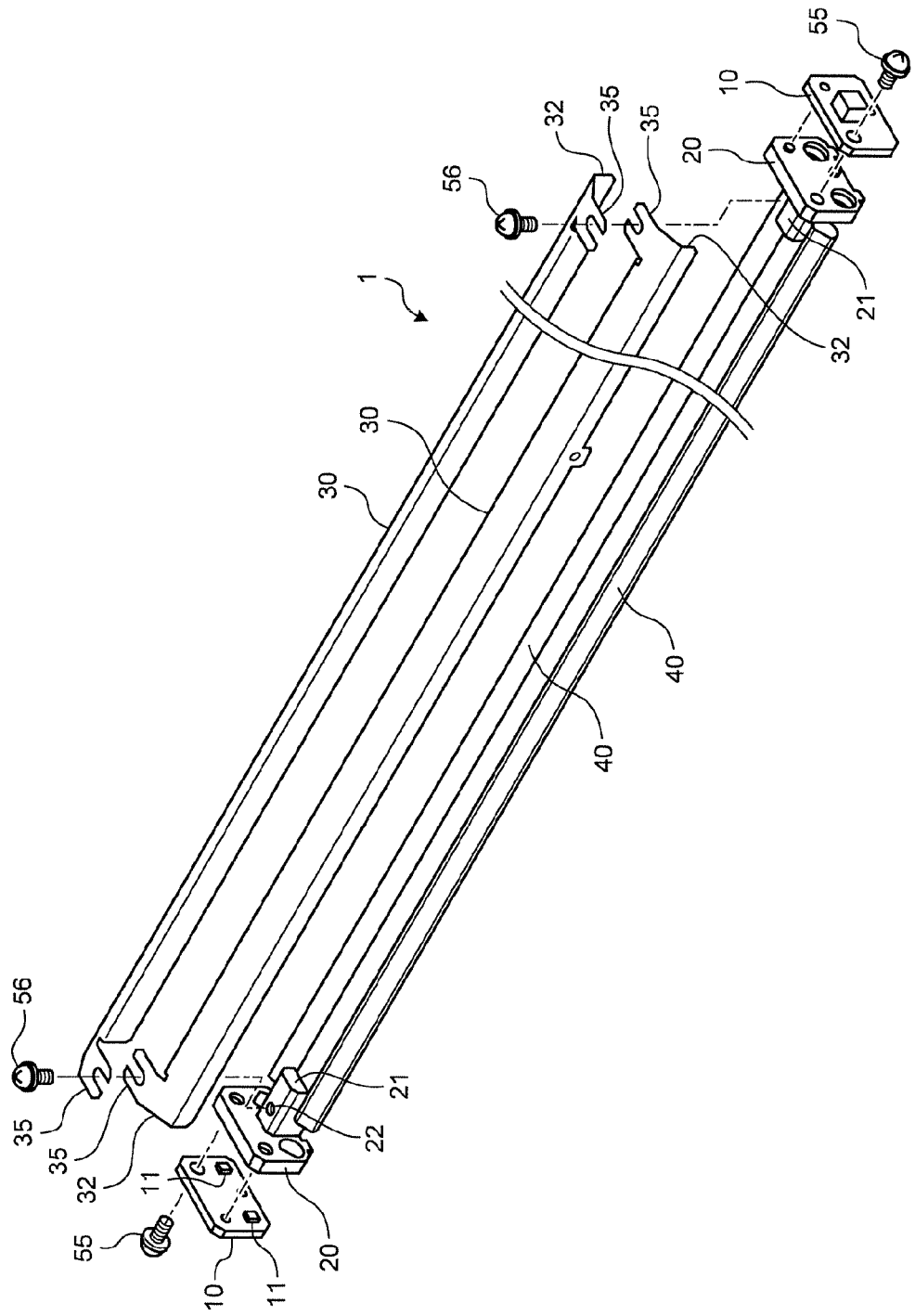
FIG. 3 is an exploded view of the light source unit as illustrated in FIG. 1.

FIG. 3 is an exploded view of the light source unit as illustrated in FIG. 1. The light source unit 1 includes a pair of light guide members 40 having outer circumferential surfaces through which lights from the LEDs 11, which are mounted on the light source substrates 10, are emitted. The pair of light guide members 40 are made of a transparent material such as resin and are formed to have substantially columnar shapes. The light guide members 40 are formed to be transparent and have the substantially columnar shapes, so that the lights from the LEDs 11 are introduced into the light guide members 40 from both ends of the light guide members in an axial direction thereof, and the lights from the LEDs 11 thus introduced are guided in the axial direction of the light guide members 40 causing reflections at inner surfaces of the light guide members 40, and enabling the lights to emit through the outer circumferential surfaces of the light guide members 40.

A pair of frames 30 are arranged between the pair of supporting members 20, and hold the pair of respective light guide members 40. That is, the light guide members 40 having the substantially columnar shapes are provided extending between the supporting members 20 in the same manner as the frames 30. The length of the light guide members 40 is equivalent to but slightly longer than the length of the frames 30 in the direction between the supporting members 20.

The pair of frames 30 holding the light guide members 40 in this manner are separated from each other in the direction orthogonal to the axial direction of the light guide members 40. A void portion 36 (see FIG. 4) as a space between the frames 30 in the direction orthogonal to the axial direction of the light guide members 40 is formed between the frames 30. The pair of frames 30 are attached to the pair of supporting members 20 at both end portions 32 of the pair of frames with respective screws 56, which functions as fasteners, so that the void portion 36 is formed between the pair of frames 30.

To be specific, coupling portions 35 are provided on the pair of frames 30 in the vicinity of both the end portions 32 in the axial direction of the light guide members 40. The coupling portions 35 projects in directions toward other one of the pair of frames 30 when the pair of frames 30 are arranged in a state of being attached to the supporting members 20. Positioning portions 21 are provided on the supporting members 20. The positioning portions 21 are inserted into a space between the pair of frames 30 in the direction orthogonal to the axial direction of the light guide members 40 so as to set the width of the void portion 36 in the direction orthogonal to the above-mentioned direction to be equal to or larger than a predetermined width. In each supporting member 20, hereinafter "the supporting member", a positioning portion 21, which is one of the positioning portions 21, is provided on one of the surfaces of the supporting member 20 at the back of a surface where one of the light source substrates 10, hereinafter "the light source substrate 10", is attached. The positioning portion projects from the supporting member 20 in a direction in which the frames 30 are arranged.

In the positioning portion 21 which is provided as described above, a screw hole 22 is formed on a surface on which the coupling portions 35 of the frames 30 are located when the light source unit 1 is assembled. Furthermore, a notch is formed on each of the coupling portions 35 formed on the frames 30. The pair of frames 30 formed as described above are attached to the supporting member 20 by overlapping the coupling portions 35 provided on the respective frames 30 on the surface of the positioning portion 21 on which the screw hole 22 is formed, by inserting the screws 56 into the screw hole 22 of the positioning portion 21 through the notch of the coupling portions 35, and fastening the screws 56. A shape of portion to insert the screw 56 that are formed on the coupling portions 35 of the frames 30 may not be the notch and may be a hole penetrating through the coupling portions 35.

The light source substrate 10, which is attached to the supporting member 20, is attached, by a screw 55 which functions as a fastener, to the surface of the supporting member 20 at the back of the surface where the positioning portion 21 is formed so that the frames 30 are attached. The light source substrate 10 is attached to the supporting member 20 by a single screw 55 such that a surface of the light source substrate at which the LEDs 11 are mounted faces the supporting member 20. This structure allows the light source substrate 10 to be detached from each supporting member 20 by detaching the single screw 55 from the supporting member 20.

Figure 4:
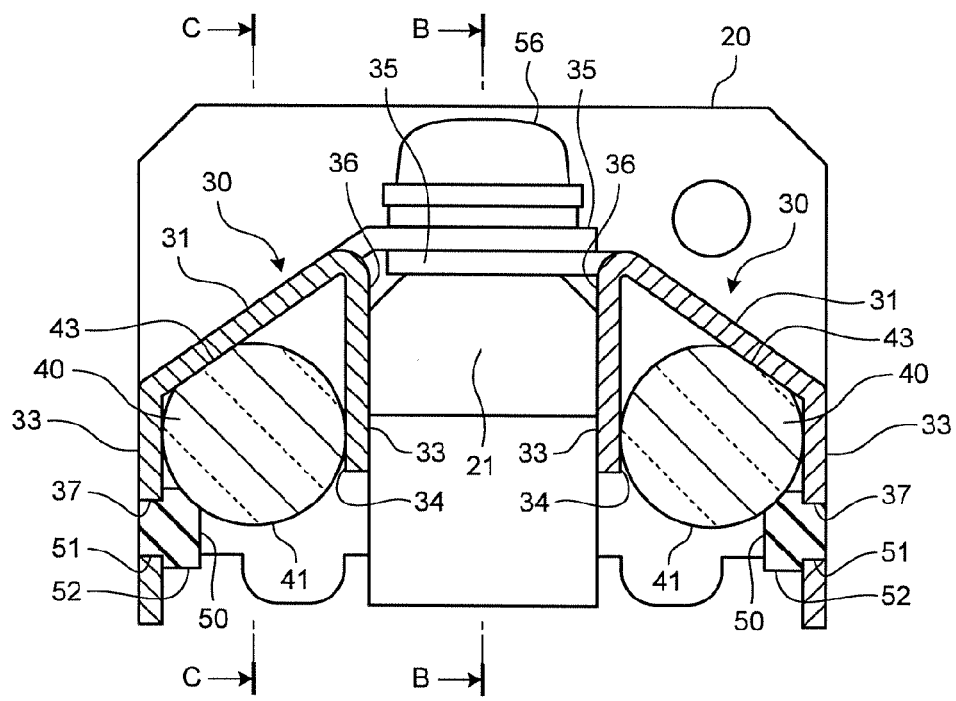
FIG. 4 is a cross-sectional view cut along line A-A in FIG. 1.

FIG. 4 is a cross-sectional view cut along line A-A in FIG. 1. Each of the pair of frames 30 includes at least a main body portion 31 and two projecting portions 33 extending from both end portions of the main body portion 31 in the direction different from the extending direction of the main body portion 31 when viewed in the axial direction of the light guide member 40. Among them, the main body portion 31 is formed in a substantially rectangular plate-like shape which extends in the width direction corresponding to the direction orthogonal to the axial direction of the light guide member 40 and in the lengthwise direction corresponding to the axial direction of the light guide member 40.

To be specific, at a position closer to the positioning portion 21 of the supporting member 20, the position of the main body portion 31 in an axial direction of the screw 56 is substantially equivalent to a position of the positioning portion 21 that correspond to the mounting surface of the coupling portion 35. Furthermore, the main body portion 31 is inclined with respect to the axial direction of the screw 56 toward an insertion direction of the screw 56 into the screw hole 22 (see FIG. 3), such that the more distantly the main body portion 31 separates from the supporting member 20 in the direction orthogonal to the axial direction of the light guide member 40, the more distantly the position of the main body portion 31 in the axial direction of the screw 56 separates from the mounting surface of the coupling portion 35 on the positioning portion 21.

The two projecting portions 33 that are provided on each frame 30 are located at both ends of the main body portion 31 in the width direction and project from the main body portion 31. That is, each frame 30 is provided with the two projecting portions 33 such that one projecting portion 33 is connected to the end portion of the main body portion 31 at a side of the other frame 30 side and the other projecting portion 33 is connected to the end portion of the main body portion 31 at the side opposite to the side at which the other frame 30 is located.

Both of the two projecting portions 33 that are provided on a single frame 30 are formed to have substantially rectangular plate-like shapes extending in the width direction corresponding to the axial direction of the screw 56 and in the lengthwise direction corresponding to the axial direction of the light guide member 40. Both of the two projecting portions 33 project from the main body portion 31 in the direction parallel with the direction in which the screw 56 is inserted into the screw hole 22. That is, the two projecting portions 33 are formed so as to be in parallel with each other and the frame 30 is formed to have a deformed U shape when viewed in the axial direction of the light guide member 40.

The pair of frames 30 are attached to the supporting members 20 in a state in which the projecting portions 33 located at sides at which the coupling portions 35 project are made to make contact with the positioning portions 21 of the supporting members 20. The pair of frames 30 are attached to the supporting members 20 in a state in which the projecting portions 33 thereof are separated from each other by the width of the positioning portions 21, that is, the pair of frames 30 are separated from each other by the width of the positioning portions 21 while excluding the coupling portions 35 which function as attachment portions to the positioning portions 21. Thus, a space formed by the projecting portions 33 with the positioning portions 21 of the supporting members 20 interposed therebetween corresponds to the void portion 36 that is formed between the pair of frames 30.

The light guide members 40 that are held by the frames 30 are inserted into spaces defined by the main body portions 31 and the two projecting portions 33 formed as described above. The pair of light guide members 40 are inserted into the spaces defined by the main body portions 31 and the two projecting portions 33 in the pair of respective frames 30, and the pair of light guide members 40 are thus held in the spaces of the frames 30.

Furthermore, an opening 34 through which the light emitted from the light guide member 40 passes is formed between the two projecting portions 33 included in the single frame 30. That is, end portions of the projecting portions 33 at the side opposite to the end portions that are connected to the main body portion 31 constitute the opening 34 through which the light emitted from the light guide member 40 held by the single frame 30 passes.

The light guide members 40 can emit light through outer circumferential surfaces 41 thereof and the pair of frames 30 can shield a part of the light that is emitted through the outer circumferential surfaces 41 of the pair of light guide members 40. That is, the respective frames 30 can cause light that is emitted through the outer circumferential surfaces 41 of the light guide members 40 held by the frames 30 to pass through the openings 34 only, and shield the light that is emitted through the outer circumferential surfaces 41 of the light guide members 40 other than light heading toward the openings 34.

The openings 34 through which the light emitted from the light guide members 40 passes have a width equal to or larger than the maximum width of the light guide members 40 when viewed in the axial direction. That is, the two projecting portions 33 included in each frame 30 are formed such that a minimum distance between the end portion of the projecting portion 33 at the side opposite to the end portion that is connected to the main body portion 31 and the other projecting portion 33 when viewed in the axial direction is larger than the diameter of each light guide member 40. To be specific, a distance between the two projecting portions 33 is slightly larger than the diameter of the light guide member 40, and the opening 34 has the width equal to or larger than the maximum width of the light guide member 40 when viewed in the axial direction.

Each frame 30 holding each light guide member 40 has a stopper portion 50 restricting movement of the light guide member 40 in the direction toward the opening 34 on one of the projecting portions 33. For example, the stopper portion 50 is arranged at the substantially center of the frame 30 in the lengthwise direction and is provided on the projecting portion 33 at the side more distant from the other frame 30 in the two projecting portions 33 included in each frame 30. The stopper portion 50 is arranged on the projecting portion 33, at a position closer to the end portion thereof, which is arranged at a side opposite to the end portion that is connected to the main body portion 31, relative to the position of the light guide member 40 held by the frame 30. The stopper portion 50 is provided on the frame 30 detachably.

To be specific, the stopper portion 50 includes a substantially columnar insertion portion 51 and a substantially columnar holding portion 52 having a diameter larger than the diameter of the insertion portion 51. The stopper portion 50 is formed to have such a shape that the insertion portion 51 and the holding portion 52 are aligned coaxially and end portions thereof are connected to each other. A stopper hole 37, which is a hole formed to have a diameter slightly larger than the diameter of the insertion portion 51, is formed on the projecting portion 33. The insertion portion 51 of the stopper portion 50 is inserted into the stopper hole 37 from a side of the surface of the projecting portion 33 at which the light guide member 40 is arranged. The stopper portion 50 is thus provided on the projecting portion 33 in such a direction that the holding portion 52 projects to the side at which the light guide member 40 is arranged. The position of the stopper portion 50 is arranged at a position where, when the light guide member 40 is arranged in the space formed by the main body portion 31 and the two projecting portions 33, the stopper portion 50 can contact the light guide member 40, which is in contact with the main body portion 31, from a position closer to the end portion of the projecting portion 33, which is an opposite end to the end portion that is connected to the main body portion 31 on the projecting portion 33. This arrangement enables the stopper portion 50 to restrict the movement of the light guide member 40 in the direction toward the opening 34.

Furthermore, a contacting plane 43 as a planar portion is formed on the outer circumference of each light guide member 40 when viewed in the axial direction. The contacting plane 43 extends in the lengthwise direction of the light guide member 40 and is formed over the lengthwise direction of the light guide member 40. The contacting plane 43 is formed so as to make surface contact with the main body portion 31 in a state in which the light guide member 40 is inserted into the frame 30. That is, the light guide member 40 is inserted into the space defined by the main body portion 31 and the two projecting portions 33 in a state in which the contacting plane 43 makes surface contact with the main body portion 31 and the movement thereof in the direction of being away from the main body portion 31 is restricted by the stopper portion 50. Diffusion-reflection treatment for diffusion-reflecting light that is guided in the light guide member 40 and emitting the light to the outside through the circumferential surface 41 is performed on the contacting plane 43 of the light guide member 40 formed in this manner by printing or the like.

Figure 5:
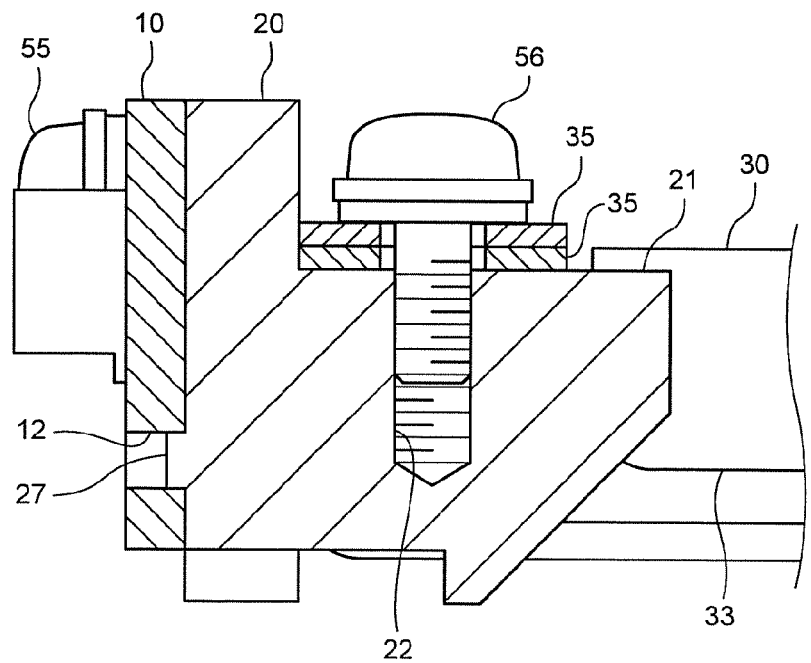
FIG. 5 is a cross-sectional view cut along line B-B in FIG. 4.

FIG. 5 is a cross-sectional view cut along line B-B in FIG. 4. The pair of frames 30 are attached to the positioning portions 21 of the supporting members 20 by the screws 56 in a state in which the coupling portions 35 of the respective frames 30 are made to overlap with each other. A first engagement protrusion 27 projecting to the direction of the light source substrate 10 is formed on the surface of each supporting member 20 at the side at which the light source substrate 10 is attached. A first engagement hole 12 into which the first engagement protrusion 27 is fitted is formed on each light source substrate 10 at a position corresponding to the first engagement protrusion 27. The first engagement protrusion 27 is a protrusion projecting in a substantially columnar shape and the first engagement hole 12 is formed to have a diameter equivalent to but slightly larger than the diameter of the first engagement protrusion 27. The light source substrates 10 are attached to the respective supporting members 20 by screwing the screw 55 into a screw hole 29 (refer to FIG. 8) of the supporting member 20 in a state in which the first engagement protrusion 27 of the supporting member 20 is fitted into the first engagement hole 12 of the light source substrate 10 so as to cause the first engagement hole 12 and the first engagement protrusion 27 to be engaged with each other.

Figure 6:
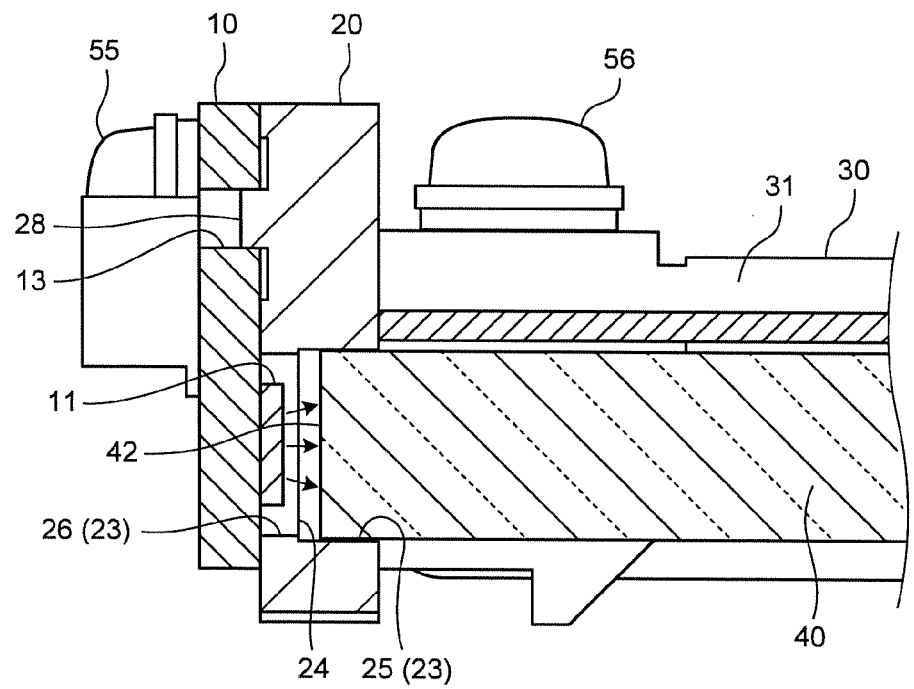
FIG. 6 is a cross-sectional view cut along line C-C in FIG. 4.

FIG. 6 is a cross-sectional view cut along line C-C in FIG. 4. A second engagement protrusion 28 projecting in the direction of the light source substrate 10 is formed on the surface of each supporting member 20 at the side at which the light source substrate 10 is attached. A second engagement hole 13 into which the second engagement protrusion 28 is fitted is formed on each light source substrate 10 at a position corresponding to the second engagement protrusion 28. The second engagement protrusion 28 is a protrusion projecting in a substantially columnar shape and the second engagement hole 13 is formed to have a diameter equivalent to but slightly larger than the diameter of the second engagement protrusion 28. The light source substrates 10 are attached to the respective supporting members 20 in a state in which the second engagement protrusion 28 of the supporting member 20 is fitted into the second engagement hole 13 of the light source substrate 10 so as to cause the second engagement hole 13 and the second engagement protrusion 28 to be also engaged with each other.

Through-holes 23 into which both end portions 42 of the pair of light guide members 40 in the axial direction are inserted are formed on the supporting members 20. That is, the through-holes 23 are formed on portions corresponding to the light guide members 40 when the frames 30 holding the light guide members 40 are attached to the supporting members 20 and are formed as holes penetrating through the supporting members 20. The LEDs 11 provided on the light source substrates 10 are mounted on the light source substrates 10 at positions overlapping with the light guide members 40 when viewed in the axial direction of the light guide members 40 when the light source substrates 10 are attached to the supporting members 20 at the sides opposite to the frames 30. With this constitution, the LEDs 11 provided on the light source substrates 10 are inserted into the through-holes 23 and face the light guide members 40 in a state in which the light source substrates 10 are attached to the supporting members 20. The light guide members 40 are inserted into the through-holes 23 from end portions thereof at the sides of the frames 30 whereas the LEDs 11 are inserted into the through-holes 23 from end portions thereof at the sides of the light source substrates 10.

Each through-hole 23 formed as described above has a step portion 24 in the axial direction and the width of the through-hole 23 when viewed in the axial direction at the LED 11 side at which the LED 11 is inserted relative to the step portion 24 is smaller than the width thereof when viewed in the axial direction at the light guide member 40 side at which the light guide member 40 is inserted relative to the step portion 24. That is, each through-hole 23 is formed as a substantially circular hole having different diameters such that the diameter of a large-diameter portion 25, which is a portion located at the light guide member 40 side relative to the step portion 24, is larger than the diameter of a small-diameter portion 26, which is a portion located at the LED 11 side relative to the step portion 24. The diameter of the small-diameter portion 26 in this case is smaller than the diameter of the light guide member 40.

The large-diameter portion 25 when viewed in the axial direction of the light guide member 40 has a shape equivalent to the shape of the light guide member 40 in the same direction. That is, the shape of the large-diameter portion 25 is not complete circle and a portion corresponding to the contacting plane 43 of the light guide member 40 is formed on the large-diameter portion 25.

Figure 7A:
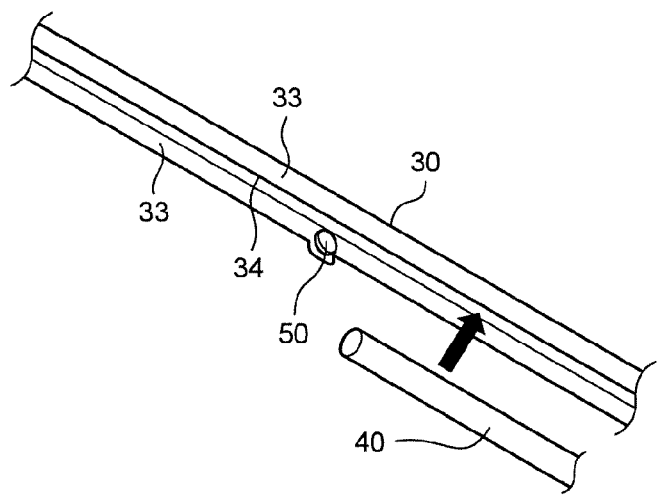
FIG. 7A is an explanatory view for explaining a state before a light guide member is assembled on a frame.

The light source unit 1 in the present embodiment is constituted as described above and a method for assembling the light source unit 1 will be described next. FIG. 7A is an explanatory view for explaining a state before the light guide member is assembled on the frame. When each light guide member 40 is assembled on each frame 30, first, the stopper portion 50 is assembled on the projecting portion 33. The stopper portion 50 is assembled by inserting the insertion portion 51 into the stopper hole 37 provided on the projecting portion 33 in such a direction that the holding portion 52 is located at the other projecting portion 33 side.

Figure 7B:
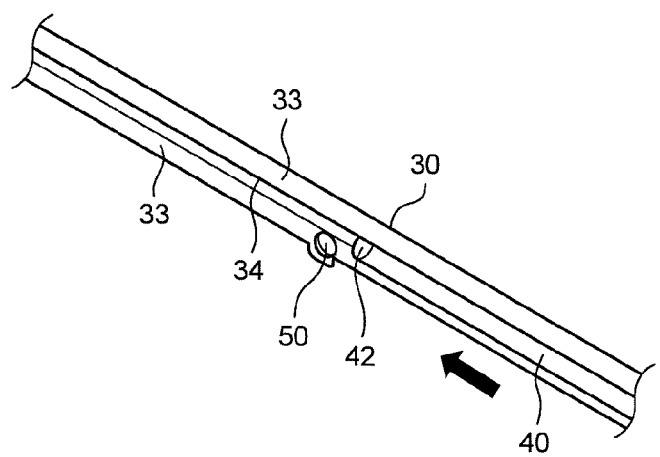
FIG. 7B is an explanatory view for explaining a state in which the light guide member is inserted into between projecting portions.

FIG. 7B is an explanatory view for explaining a state in which the light guide member is inserted into between the projecting portions. After the stopper portion 50 is assembled on the projecting portion 33, the light guide member 40 is inserted into between the projecting portions 33 such that the entire light guide member 40 is located at one of sides relative to the stopper portion 50 in the lengthwise direction of the frame 30. That is, the light guide member 40 is inserted into between the projecting portions 33 of the frame 30 setting the extending direction of the light guide member 40 is set to the same direction as that of the extending direction of the frame 30. In this case, the light guide member 40 is inserted in such a direction that the contacting plane 43 makes surface contact with the main body portion 31 of the frame 30.

Figure 7C:
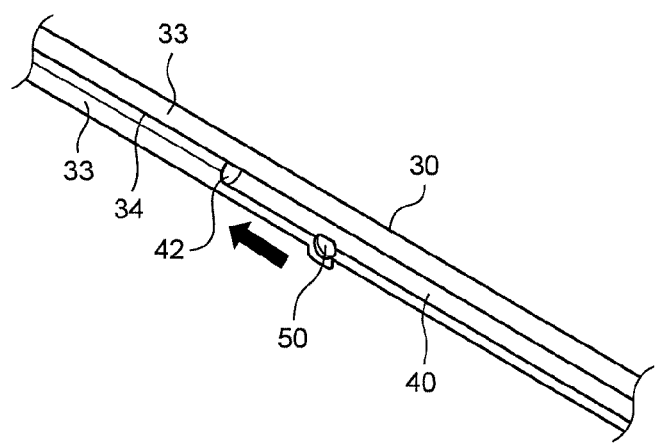
FIG. 7C is an explanatory view for explaining a state in which the light guide member is made to pass through a position at which a stopper portion is provided.

FIG. 7C is an explanatory view for explaining a state in which the light guide member is made to pass through a position at which the stopper portion is provided. After the light guide member 40 is inserted into between the projecting portions 33, the light guide member 40 is moved between the projecting portions 33 along the frame 30 in a direction in which the end portion 42 thereof, being located at the stopper portion 50 side, advances over the position where the stopper portion 50 is arranged in the lengthwise direction of the frame 30. By this movement, the light guide member 40 is positioned at both sides of the position where the stopper portion 50 is arranged, hereinafter, "the arrangement portion of the stopper portion 50", in the lengthwise direction of the frame 30, and the stopper portion 50 can hold the light guide member 40.

FIG. 7D is an explanatory view for explaining a state in which assembly of the light guide member on the frame is completed. After the state in which the light guide member 40 is located at both sides of the arrangement portion of the stopper portion 50 in the lengthwise direction of the frame 30 and the stopper portion 50 can hold the light guide member 40 is established, the light guide member 40 is moved as it is, along the lengthwise direction of the frame 30. This movement causes the light guide member 40 to be located at a position at which both the end portions 42 thereof are made close to both the end portions 32 of the frame 30. When both the end portions 42 of the light guide member 40 are located to be close to both the end portions 32 of the frame 30, both the end portions 42 of the light guide member 40 project from both the end portions 32 of the frame 30 because the light guide member 40 is longer than the frame 30. In this manner, the pair of light guide members 40 are assembled on the pair of respective frames 30, by being located between the projecting portions 33 so as to be held by the stopper portions 50.

After the light guide members 40 are assembled on the frames 30, the pair of frames 30 are attached to the supporting members 20. That is, the coupling portions 35 provided on the respective frames 30 are made to overlap with each other in a state in which the coupling portions 35 project to the directions of the opposing frames 30, and the overlapped coupling portions 35 are fastened by screwing the screws 56 into the screw holes 22 of the positioning portions 21 of the supporting members 20. In this case, the projecting portions 33 of the respective frames 30 that are located at the sides of the coupling portions 35 are made to abut against the positioning portions 21 of the supporting members 20, and the end portions 42 of the light guide members 40 that are supported by the frames 30 are inserted into the large-diameter portions 25 of the through-holes 23 on the supporting members 20. With these operations, portions in the vicinity of both the end portions 32 of the pair of frames 30 are attached to the supporting members 20 in a state in which the void portion 36 having the width of the positioning portions 21 is formed and the end portions 42 of the light guide members 40 are inserted into the through-holes 23 of the supporting members 20.

Figure 8:
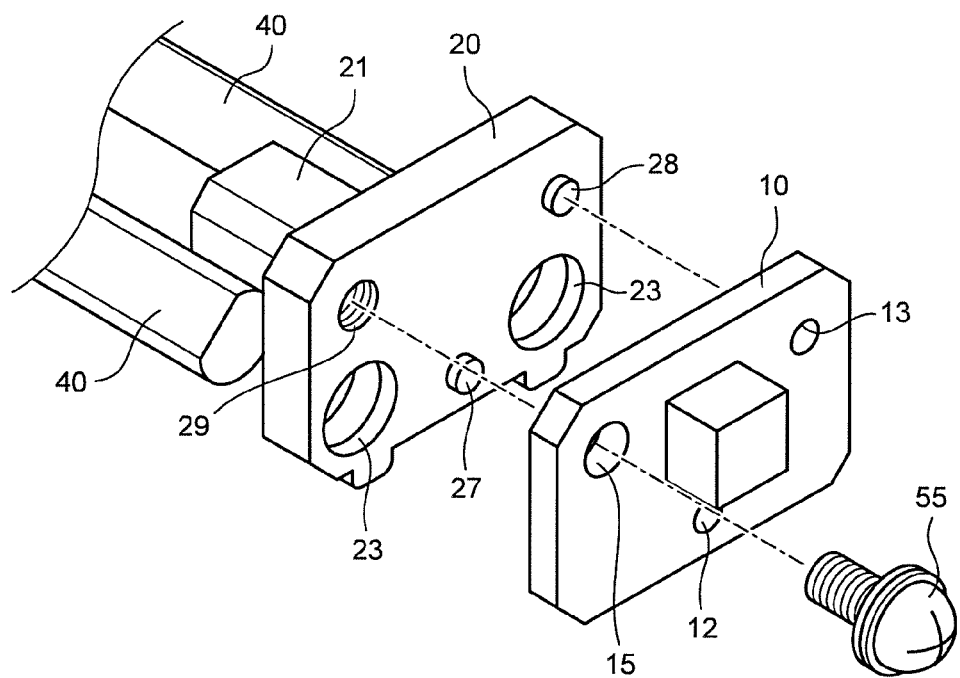
FIG. 8 is an explanatory view for explaining a state when a light source substrate is attached to a supporting member.

FIG. 8 is an explanatory view for explaining a state where the light source substrate is attached to the supporting member. The light source substrates 10 are attached to the surfaces of the supporting members 20 at the back of the surface where the frames 30 are attached. As the order of the attachment of the frames 30 and the light source substrates 10 to the supporting members 20, whichever of them may be attached first. The light source substrates 10 are attached to the supporting members 20 by making the surfaces thereof on which the LEDs 11 are mounted to face the supporting members 20 and causing the LEDs 11 to be fitted into the small-diameter portions 26 of the through-holes 23. In this case, positioning is performed while the first engagement protrusions 27 of the supporting members 20 are fitted into the first engagement holes 12 of the light source substrates 10 and the second engagement protrusions 28 of the supporting members 20 are fitted into the second engagement holes 13 of the light source substrates 10. In a state in which the positioning by a combination of the first engagement protrusions 27 and the first engagement holes 12 and a combination of the second engagement protrusions 28 and the second engagement holes 13 has been performed, the light source substrates 10 are attached to the supporting members 20 by inserting the screws 55 into attachment holes 15 of the light source substrates 10 and screwing the screws 55 into the screw holes 29 of the supporting members 20. With these processes, the light source substrates 10 are attached to the supporting members 20 in a state in which the LEDs 11 face the light guide members 40.

The light source substrates 10 are attached to the respective supporting members 20 by only one screw 55. That is, when the light source substrate 10 is exchanged due to failure of the LEDs 11 or the light source substrate 10, the light source substrate 10 can be detached and exchanged only by detaching the screw 55.

Figure 9:
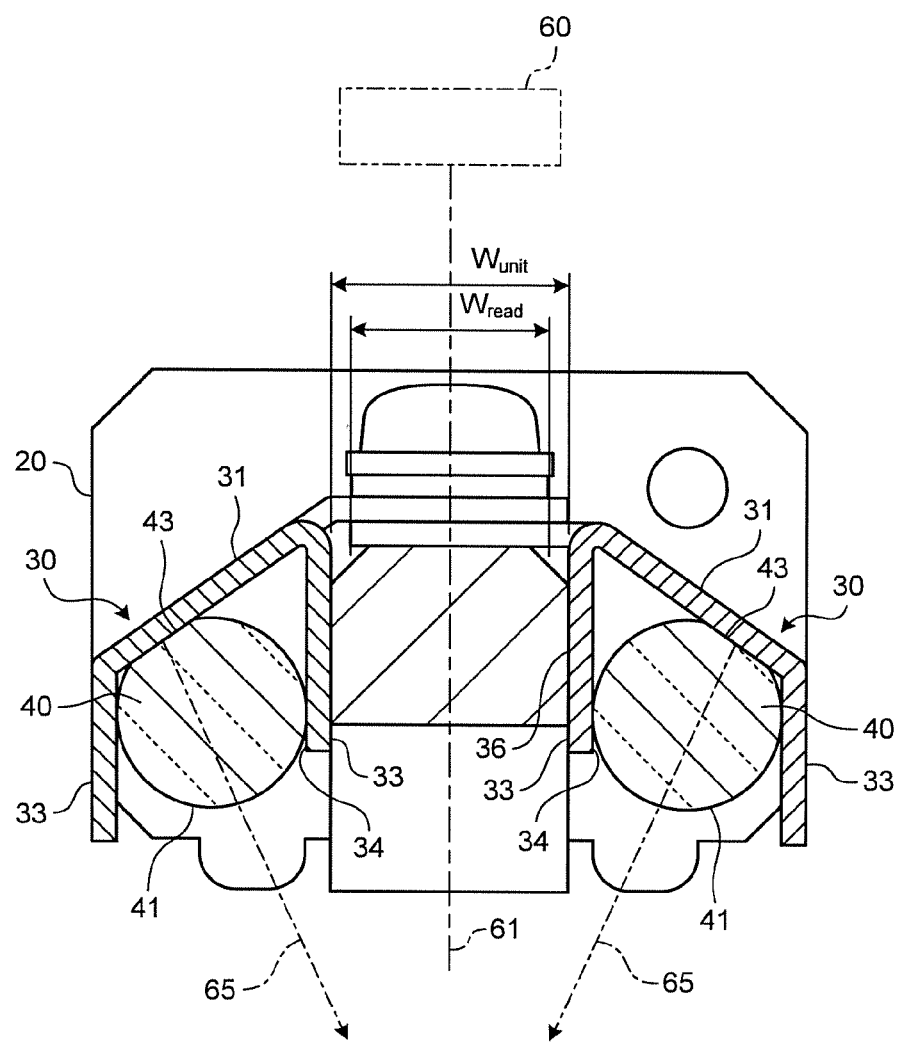
FIG. 9 is an explanatory view for explaining a state when the light source unit emits light.

Next, actions of the light source unit 1 constituted and assembled as described above will be described. FIG. 9 is an explanatory view for explaining a state when the light source unit emits light. For example, the light source unit 1 is provided on a scanner or the like for reading an image formed by image-capturing an image-captured medium (not illustrated) and is used for emitting light to the image-captured medium at the time of image capturing of the image-captured medium. When the light source unit 1 is incorporated into the scanner, the light source unit 1 is incorporated such that an optical axis of an image capturing device 60 passes through the void portion 36 when viewed in the axial direction of the light guide member 40. That is, the light source unit 1 is incorporated such that a reading center 61 of the image capturing device 60 passes through the vicinity of the center of the void portion 36 in the direction between the frames 30. In this case, a what-is-called line sensor in which a plurality of light receiving elements are arranged in a one-dimensional array form is used as the image capturing device 60. The light source unit 1 is arranged in such a direction that the lengthwise direction of the frames 30 is parallel with the array direction of the light receiving elements provided in the image capturing device 60. Furthermore, the light source unit 1 is arranged in such a direction that a side on which the openings 34 are positioned is opposite to a side on which the image capturing device is positioned.

In the light source unit 1 arranged so as to have the above-mentioned relative positional relation to the image capturing device 60, a relation between an opening width $W_{unit}$ of the void portion 36 after assembly of the light source unit 1, which is determined by the positioning portions 21, and an opening width $W_{read}$, which is necessary for the image capturing device 60 to read, satisfies $W_{unit} \geq W_{read}$. $W_{read}$ is an opening width that is desired to be ensured for performing appropriate reading when reading is performed by the image capturing device 60 in consideration of variations and assembling accuracy of the individual components of the image capturing device 60 and the light source unit 1. The light source unit 1 enables the image capturing device 60 to image-capture the image-captured medium through the void portion 36 by assembling the light source unit 1 because the projecting portions 33 of the frames 30 contact with the positioning portions 21 so as to set the opening width $W_{unit}$ of the void portion 36 equal to or larger than the opening width $W_{read}$ necessary for reading.

When the light source unit 1 irradiates the image-captured medium with light, the LEDs 11 that are mounted on the light source substrates 10 are driven to emit light. Since the LEDs 11 face the end portions 42 of the light guide members 40, when the LEDs 11 are driven to emit light, the light emitted from the LEDs 11 is incident into the light guide members 40 from the end portions 42 of the light guide members 40. The light incident into the light guide members 40 is guided in the lengthwise direction of the light guide members 40 while repeating total reflection in the light guide members 40.

Among light conducted in the light guide member 40, light which hits portions of the contacting plane 43 where diffusion-reflection treatment is furnished is diffusion-reflected by the portions. Although the diffusion-reflected light also advances toward the direction of the inner surfaces of the light guide member 40, a part of the light, which hits the inner surfaces of the light guide members 40 at an angle at which the total reflection at the inner surfaces of the light guide member 40 is impossible, is emitted through the outer peripheral surface of the light guide member 40. Since the light guide member 40 is inserted into the space defined by the main body portion 31 and the two projecting portions 33 of the frame 30, among light emitted through the outer circumferential surfaces 41 of the light guide members 40, light advancing in the direction other than the direction toward the opening 34 is shielded by the main body portion 31 and the projecting portions 33. Thus, the light emitted through the outer circumferential surfaces 41 of the light guide member 40 is emitted to the outside of the light source unit 1 only through the opening 34 as irradiation light 65 from the light source unit 1.

The irradiation light 65 emitted from the openings 34 is emitted in the opposite direction to the side at which the image capturing device 60 is located. The image-captured medium is irradiated with the irradiation light 65 at the time of image capturing by the image capturing device 60 and the image capturing device 60 image-captures the image-captured medium irradiated with the irradiation light 65 emitted from the light source unit 1 through the void portion 36.

Figure 10:
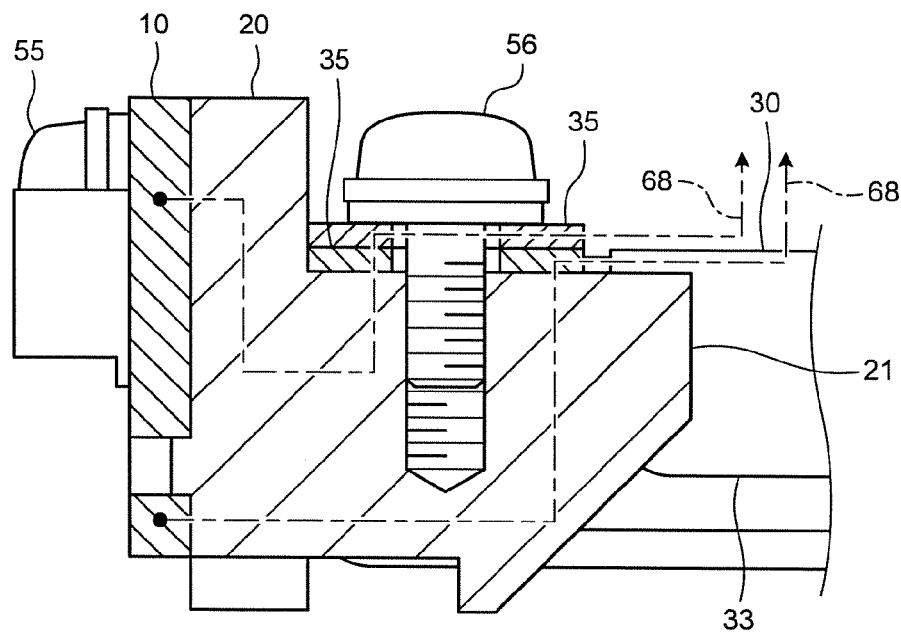
FIG. 10 is an explanatory view for explaining heat transmission paths.

FIG. 10 is an explanatory view for explaining heat transfer paths. When the light source unit 1 emits the irradiation light 65, the LEDs 11 are driven to emit light. When the LEDs 11 emit light, the LEDs 11 and the light source substrates 10 generate heat. Meanwhile, the supporting members 20 to which the light source substrates 10 are attached and the frames 30 that are attached to the supporting members 20 are made of a metal material having high heat conductivity to obtain high heat dissipation performance. Most heat generated from the light source substrates 10 is therefore transferred to the supporting members 20 and the heat transferred to the supporting members 20 is transferred to the frames 30 from the supporting members 20. That is, the frames 30 receive the heat that is generated at the light source substrates 10 through the supporting members 20. Having high heat conductivity, the frames 30 that have received the heat from the supporting members 20 transfer the heat to portions in the frames 30. Furthermore, the frames 30 have large surface areas, so that the heat transferred from the supporting members 20 are dissipated to the atmosphere from the surfaces of the frames 30.

Heat paths 68, which are heat transfer paths for heat generated by the LEDs 11 and the light source substrates 10 when the LEDs 11 emit light, function as paths through which the heat is transferred from the light source substrates 10 to the frames 30 via the supporting members 20, to be dissipated to the atmosphere from the frames 30. The heat generated by the LEDs 11 and the light source substrates 10 is thus dissipated to the atmosphere from the frames 30 having large surface areas, thereby providing effective heat dissipation.

In the light source unit 1 according to the above-mentioned embodiment, each of the frames 30 holding the light guide member 40 includes the main body portion 31 and the two projecting portions 33, and as a result, the frames 30 have an increased cross-sectional coefficient when viewed in the axial direction of the light guide member 40. The increased cross-sectional coefficient enables the frames 30 to have increased strength in the bending direction. Furthermore, since the supporting members 20 and the frames 30 are made of a metal material, the heat generated by the LEDs 11 emitting light can be transferred from the supporting members 20 to the frames 30 having large surface areas, and effectively dissipated from the frames 30. The light source substrates 10 on which the LEDs 11 are mounted are not directly attached to the frames 30 but are attached to the supporting members 20 to which the frames 30 are attached, which enables the light source substrates 10 to be attached and detached easily at the time of assembly and a maintenance operation. Consequently, assembly performance can be improved when the light guide members 40 are provided in plurality, while ensuring strengths of the members holding the light guide members 40 and heat dissipation performance of heat that is generated from the LEDs 11 and the light source substrates 10.

The light source substrate 10 is attached to the supporting member 20 by the single screw 55, and can be detached from the supporting member 20 by detaching the single screw 55 from the supporting member 20. This constitution enables assembly and detachment of the light source substrate 10 to be performed more reliably and easily. As a result, assembly performance and maintainability can be improved more reliably.

Furthermore, the width of the opening 34 in the frame 30 is set to be equal to or larger than the maximum width of the light guide member 40 and the stopper portion 50 is provided on the frame 30. With this constitution, when the frame 30 holds the light guide member 40, the light guide member 40 are inserted into between the stopper portion 50 and the main body portion 31 from the vicinities of the position of the stopper portion 50. Then, the inserted light guide member 40 is moved along the frame 30 and the frame 30 can hold the light guide member 40. This operation can make distance of movement of the light guide member 40 along the frame 30 short when the frame 30 holds the light guide member 40. As a result, assembly performance can be improved more reliably and damage of the light guide member 40 and the frame 30 due to movement of the light guide member 40 over a long distance along the frame 30 can be prevented.

The stopper portion 50 is detachably attached to the frame 30. The stopper portion 50 can be therefore provided on the frame 30 easily. That is, for example, the frame 30 made of a metal material can be produced by sheet-metal processing and the stopper portion 50 can be provided on the frame 30. As a result, the manufacturing cost can be reduced.

The contacting plane 43 is formed on the outer circumference of the light guide member 40 when viewed in the axial direction and the contacting plane 43 makes surface contact with the main body portion 31 in a state in which the light guide member 40 are inserted into the frame 30, thereby performing positioning of the light guide member 40 in the circumferential direction about the center axis of the light guide member 40. As a result, the irradiation light 65 that is emitted from the light guide member 40 can be emitted with desired irradiation characteristics more easily and reliably.

Both of the light guide members 40 and the LEDs 11 are inserted into the through-holes 23 and face each other through the through-holes 23. With this constitution, positioning between the light guide members 40 and the LEDs 11 can be performed easily and light emitted from the LEDs 11 can be guided into the light guide members 40 more reliably. The through-holes 23 have the step portions 24 and the small-diameter portions 26 thereof have the diameter smaller than the diameter of the light guide members 40, thereby restricting the movement of the light guide members 40 to the LEDs 11 side. Accordingly, the positioning of the light guide members 40 in the axial direction can be performed with the simple constitution. Consequently, assembly performance and maintainability can be improved more reliably, and the light emitted from the LEDs 11 can be made to be incident into the light guide members 40 in a desired state and light can be emitted from the light guide members 40 more appropriately.

The positioning portion 21 is provided on the supporting member 20. The positioning portions 21 is fitted into between the frames 30 so as to make the width of the void portion 36 equal to or larger than a predetermined width. When the light source unit 1 is used as a light source for light emission that is used for image capturing by the image capturing device 60, the opening width $W_{unit}$ of the void portion 36 can be made equal to or larger than the opening width $W_{read}$ necessary for reading by the image capturing device 60 more reliably. As a result, when the pair of frames 30 hold the pair of respective light guide members 40, positioning of the frames 30 can be performed easily and assembly performance can be improved more reliably.

Variations

Figure 11:
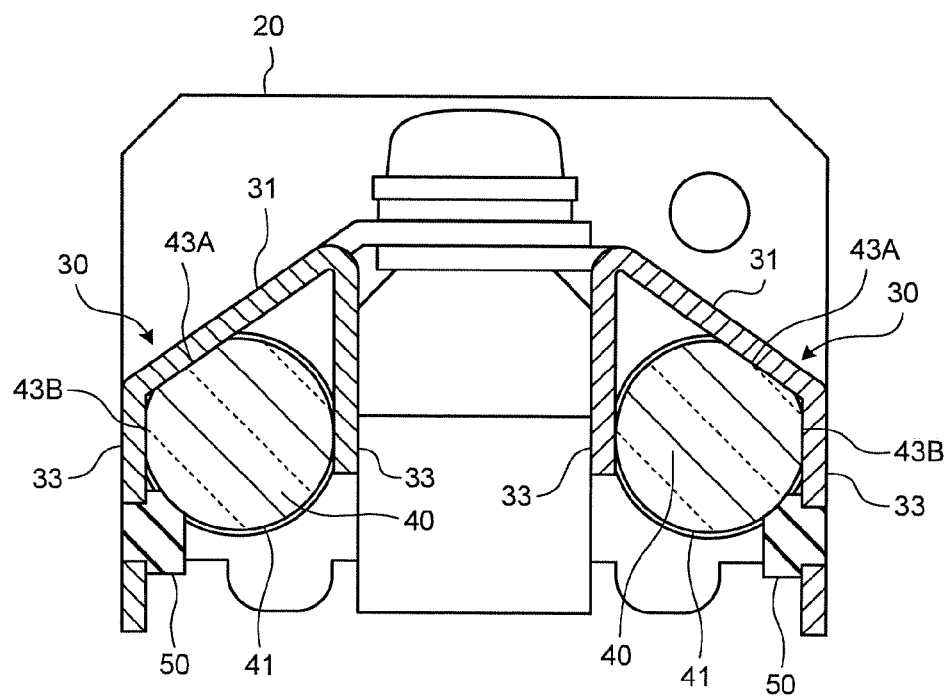
FIG. 11 is an explanatory view for explaining a variation of the light source unit in the present embodiment, where contacting planes are formed at two places on the light guide member.

Although, in the light source unit 1 in the above-mentioned embodiment, the contacting plane 43 is formed at one place on the outer circumferential surface 41 of each light guide member 40, the contacting plane 43 may be provided at a plurality of places. For example, the contacting planes 43 may be formed at two places on the outer circumferential surface 41. FIG. 11 is an explanatory view for explaining a case where two places of the contacting planes 43A (oblique contacting plane) and 43B (vertical contacting plane) are formed on the light guide member as a variation of the light source unit in the present embodiment. The diffusion-reflection treatment for diffusion-reflecting the light that is guided in each light guide member 40 is furnished on the contacting planes 43A of the light guide member 40. When a positioning portion for performing the diffusion-reflection treatment is necessary, the contacting plane 43B for positioning may be formed. As described above, the formation of the contacting plane 43B for positioning for the diffusion-reflection treatment enables the diffusion-reflection treatment to be performed appropriately, thereby emitting light from the light guide member 40 with desired irradiation characteristics more reliably.

Furthermore, when the contacting plane 43B for positioning to furnish the diffusion-reflection treatment is formed in addition to the contacting plane 43A on which the diffusion-reflection treatment is furnished, it is preferable that the contacting plane 43B be made to make surface contact with the projecting portion 33 of the frame 30. When each light guide member 40 is inserted into the space defined by the main body portion 31 and the two projecting portions 33 of the frame 30, by the surface contact with the projecting portion 33, the light guide member 40 is prevented from rotating easily about the center axis of the light guide member 40. Accordingly, the positioning of the light guide member 40 in the circumferential direction can be performed more reliably, when the light guide member 40 is held by the frame 30. Thus, the number of contacting planes 43 is not limited, as long as the contacting plane 43A is formed at at least one place on the outer circumference of the light guide member 40 when viewed in the axial direction, and the light guide member 40 is in a state of being inserted into the frame 30 and held by the frame 30 such that the contacting plane 43A makes surface contact with at least the main body portion 31 among the main body portion 31 and the two projecting portions 33.

Furthermore, in the light source unit 1 in the above-mentioned embodiment, although the stopper portion 50 is provided at one place on the single frame 30, the stopper portion 50 may be provided at two or more places. Furthermore, the stopper portion 50 is provided on one projecting portion 33 at the side opposite to the side at which the other frame 30 is located in the two projecting portions 33 included in the single frame 30. Alternatively, the stopper portion 50 may be provided on the projecting portion 33 at the side at which the other frame 30 is located. The number and position of stopper portion 50 are not limited as long as the stopper portion 50 is provided at at least one place in the axial direction of the light guide member 40 on one of the projecting portions 33 included in each frame 30.

Figure 12:
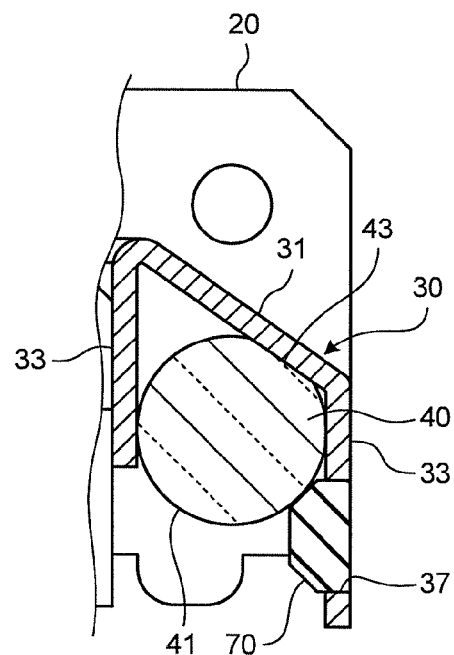
FIG. 12 is an explanatory view for explaining a variation of the light source unit in the present embodiment, where the stopper portion is fixed to the frame.

Moreover, the stopper portion 50 may be incapable of being detached from each frame 30. FIG. 12 is an explanatory view for explaining a case where the stopper portion is fixed to the frame as a variation of the light source unit in the present embodiment. The stopper portion that is provided on the frame 30 may be a fixed stopper portion 70 that is made to adhere to the stopper hole 37 formed on the projecting portion 33 by an adhesive so as to be fixed. The fixed stopper portion 70 that is fixed to the projecting portion 33 is thus employed as the stopper portion so as to prevent parts from being lost and simplify a process at the time of the assembly, thereby improving assembly performance more reliably.

In the light source unit 1 in the above-mentioned embodiment, although the light source substrates 10 on which the LEDs 11 are mounted are attached to both of the pair of supporting members 20, the light source substrate 10 may be attached to only one of the pair of supporting members 20. Even though the light source substrate 10 is attached to only one of the pair of supporting members 20, it is possible to guide the light from the LEDs 11 into the light guide members 40 from one end portions 42 thereof and cause the light to be emitted to the outside through the outer circumferential surfaces 41 of the light guide members 40. As described above, it is sufficient that the light source substrate 10 is attached to at least one of the pair of supporting members 20 and the light from the LEDs 11 is guided into the light guide members 40 from at least one of both the end portions 42 thereof in the axial direction of the light guide members 40.

Although the light guide members 40 are held by the frames 30, and the light guide members 40 are also held by the supporting members 20 while both the end portions 42 thereof are inserted into the through-holes 23 of the supporting members 20 in the light source unit 1 in the above-mentioned embodiment, the light guide members 40 may be constituted so as not to be inserted into the through-holes 23 of the supporting members 20. The stopper portions 50 may be provided on the frames 30 not only at the positions in the vicinity of the centers in the lengthwise direction but also at positions closer to the end portions 32 and the frames 30 may hold the light guide members 40 using the stopper portions 50. In this case, the movement of the light guide members 40 in the axial direction may be restricted by causing the end portions 42 of the light guide members 40 to abut against the supporting members 20. As described above, a structure of holding the light guide members 40 may be arbitrary as long as the pair of light guide members 40 are held at least by the pair of respective frames 30.

Figure 13:
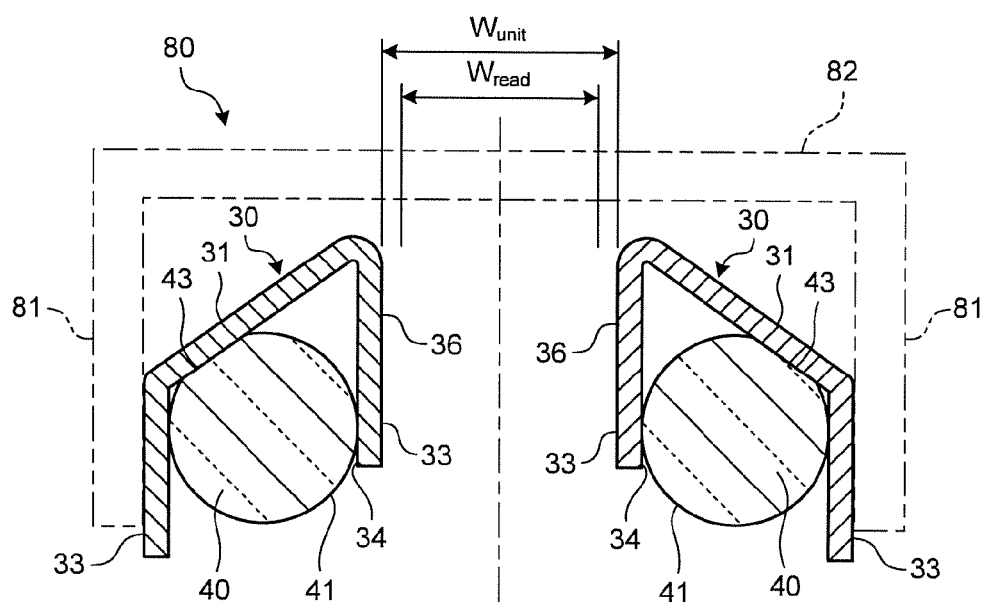
FIG. 13 is an explanatory view for explaining a variation of the light source unit in the present embodiment, where the frames are positioned from the outer sides of the frames in the width direction.

In the light source unit 1 in the above-mentioned embodiment, although the desired width of the void portion 36 is ensured by causing the projecting portions 33 of the frames 30 to abut against the positioning portions 21 included in the supporting members 20, the desired width of the void portion 36 may be ensured by another method. FIG. 13 is an explanatory view for explaining a case where the frames are positioned from the outer sides of the frames in the width direction as a variation of the light source unit in the present embodiment. In order to ensure a desired width of the void portion 36 formed between the frames 30 is ensured, for example, an external positioning member 80 may be used as illustrated in FIG. 13. The external positioning member 80 is constituted by including external holding portions 81 and a width-direction coupling portion 82. The external holding portions 81 are portions that make contact with the projecting portions 33 at the sides opposite to the sides at which the other frames 30 are located in the two projecting portions 33 included in the respective frames 30 from the outer sides in the direction orthogonal to the axial direction of the light guide members 40, that is, the width direction of the void portion 36, and the two external holding portions 81 are provided so as to correspond to the pair of frames 30. The width-direction coupling portion 82 is a portion coupling the two external holding portions 81 that are provided so as to correspond to the pair of frames 30.

The external positioning member 80 is provided integrally with the supporting members 20, for example. When the frames 30 are positioned using the external positioning member BO constituted as described above, the projecting portions 33 located at the sides opposite to the sides at which the other frames 30 are located are made to abut against the external holding portions 81 of the external positioning member 80 when the frames 30 are attached to the supporting members 20. In this structure, the width of the void portion 36 formed by the frames 30 attached to the supporting members 20 can be set to be equal to or larger than a predetermined width. The opening width $W_{unit}$ of the void portion 36 can be thus made equal to or larger than the opening width $W_{read}$ necessary for reading even when the light source unit 1 is used as a light source emitting light that is used for image capturing by the image capturing device 60.

The light source unit according to the present invention provides an effect that assembly performance can be improved while ensuring strength of the members holding respective light guide members and dissipation performance of heat generated from the light source in the case where the light source unit includes a plurality of light guide members.

What is claimed is:

1. A light source unit comprising:
one or two light source substrates, each including light emitting elements mounted thereon;
a pair of first members that are arranged separately from each other, at least one of the pair of first members is provided with one of the one or two light source substrates attached thereto;
a pair of light guide members, each of which having end portions at respective both ends in an axial direction thereof, in each of which light from the light emitting elements is introduced therein from at least one of the end portions, and the pair of light guide members emitting the light introduced inside thereof through outer circumferential surfaces thereof; and
a pair of second members between which the pair of respective light guide members are inserted, the pair of second members shielding a part of the light emitted through the outer circumferential surfaces of the pair of light guide members, wherein
each of the pair of second members is made of a metal material and includes at least a main body portion, two projecting portions extending from both end portions of the main body portion when viewed in an axial direction in directions different from an extending direction of the main body portion, and an opening formed between the projecting portions through which the light emitted from the light guide member passes,
each of the pair of second members includes end portions at both ends thereof in the axial direction, and the end portions are attached to the pair of first members respectively, in a state in which the pair of second members are arranged between the pair of first members, so that the pair of second members receive heat generated from the light source substrate through at least one of the first members,
the pair of second members are arranged separately from each other in a direction orthogonal to the axial direction, forming a void portion therebetween when viewed in the axial direction, so that an optical axis of an image capturing device passes through the void portion, and the pair of light guide members are held at least by the pair of respective second members.

2. The light source unit according to claim 1, wherein the light source substrate is attached to at least one of the first members with a fastener and is capable of being detached from at least one of the first members by detaching the fastener.

3. The light source unit according to claim 1, wherein the pair of second members have stopper portions at at least one place in the axial direction on one of the projecting portions, a width of the openings when viewed in the axial direction is equal to or larger than a maximum width of the light guide members, and the stopper portions restrict movement of the light guide members in a direction toward the openings.

4. The light source unit according to claim 3, wherein the stopper portions are detachably attached to the second members.

5. The light source unit according to claim 1, wherein a contacting plane is formed at at least one place on outer circumferences of the light guide members when viewed in the axial direction, and the contacting plane makes surface contact with at least the main body portions among the main body portions and the two projecting portions in a state in which the light guide members are inserted into the second members.

6. The light source unit according to claim 1, wherein the first members are provided with respective through-holes into which both end portions of the pair of light guide members in the axial direction are inserted, the light emitting elements are inserted into the through-holes and face the light guide members in a state in which the light source substrate is attached to at least one of the first members, and the through-holes have step portions in an axial direction, and a width of the through-holes at the light emitting element side at which the light emitting elements are inserted relative to the step portions when viewed in the axial direction is smaller than a width of the through-holes at the light guide member side at which the light guide members are inserted relative to the step portions when viewed in the axial direction.

7. The light source unit according to claim 1, wherein the first members are provided with positioning portions making a width of the void portion in a direction orthogonal to the axial direction be equal to or larger than a predetermined width by being interposed between the pair of second members in the direction orthogonal to the axial direction.

* * * * *